(12) United States Patent
Swvigaradoss et al.

(10) Patent No.: US 11,734,025 B2
(45) Date of Patent: Aug. 22, 2023

(54) CONFIGURABLE ACTION GENERATION FOR A REMOTE NETWORK MANAGEMENT PLATFORM

(71) Applicant: ServiceNow, Inc., Santa Clara, CA (US)

(72) Inventors: Jebakumar Mathuram Santhosam Swvigaradoss, Hyderabad (IN); Sarthak Jain, Hyderabad (IN); Sharfuddin Mohammed, Hyderabad (IN); Manjeet Singh, Milpitas, CA (US); Sakshi Kataria, Hyderabad (IN)

(73) Assignee: ServiceNow, Inc., Santa Clara, CA (US)

(*) Notice: Subject to any disclaimer, the term of this patent is extended or adjusted under 35 U.S.C. 154(b) by 247 days.

(21) Appl. No.: 17/070,391

(22) Filed: Oct. 14, 2020

(65) Prior Publication Data
US 2022/0113988 A1    Apr. 14, 2022

(51) Int. Cl.
*G06F 9/448* (2018.01)
*H04L 43/08* (2022.01)
(Continued)

(52) U.S. Cl.
CPC ........ *G06F 9/4494* (2018.02); *G06F 3/04842* (2013.01); *G06F 11/00* (2013.01);
(Continued)

(58) Field of Classification Search
CPC .... A63F 13/833; A63F 13/55; G06F 3/04842; G06F 11/00
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

*Primary Examiner* — Barbara B Anyan
(74) *Attorney, Agent, or Firm* — McDonnell Boehnen Hulbert & Berghoff LLP

(57) ABSTRACT

An embodiment includes storage containing configuration and operational data related to a managed network, an action configurator application, and an action execution application. The embodiment also includes one or more processors configured to: receive, by way of the action configurator application, a specification of an action type; receive, by way of the action configurator application, a specification of an input source for actions generated using the action type; receive, by way of the action configurator application, a specification of one or more target users and an output modality for the actions; receive, by way of the action configurator application, a specification of a condition that causes the actions to be generated; determine, that the condition has been satisfied; and cause the action execution application to execute the action generator on the input source, and produce an output for one of the target users by way of the output modality.

20 Claims, 16 Drawing Sheets

(51) Int. Cl.
*H04L 41/0803* (2022.01)
*G06N 20/00* (2019.01)
*G06F 16/22* (2019.01)
*H04L 41/50* (2022.01)
*H04L 67/75* (2022.01)
*G06F 11/00* (2006.01)
*G06F 3/04842* (2022.01)
*H04L 9/40* (2022.01)
*A63F 13/55* (2014.01)
*A63F 13/833* (2014.01)

(52) U.S. Cl.
CPC ......... *G06F 16/2282* (2019.01); *G06N 20/00* (2019.01); *H04L 41/0803* (2013.01); *H04L 41/50* (2013.01); *H04L 43/08* (2013.01); *H04L 67/75* (2022.05); *A63F 13/55* (2014.09); *A63F 13/833* (2014.09); *H04L 63/0272* (2013.01); *H04L 63/0281* (2013.01)

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,296,187 B1* | 5/2019 | Gregg ............... G06F 3/04842 |
| 10,672,251 B1* | 6/2020 | Krayer ............... G08B 21/182 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2009/0254489 A1* | 10/2009 | Geller ............... G06Q 40/04 705/36 R |
| 2010/0110932 A1 | 5/2010 | Doran et al. |
| 2011/0106736 A1* | 5/2011 | Aharonson ....... H04M 1/72472 706/46 |
| 2014/0272862 A1* | 9/2014 | Hussam ............. G09B 7/02 434/262 |
| 2015/0126286 A1* | 5/2015 | Guo ................. A63F 13/55 463/42 |
| 2016/0314403 A1* | 10/2016 | Chakraborty ....... H04L 67/02 |
| 2019/0087247 A1* | 3/2019 | Chakraborty ....... G06F 11/00 |

(56) References Cited

U.S. PATENT DOCUMENTS

2021/0283504 A1* 9/2021 Ikeda .................... A63F 13/833
2022/0110265 A1* 4/2022 Chakraborty ........... A01F 25/14

FOREIGN PATENT DOCUMENTS

| WO | WO 99/34285 | 7/1999 |
| WO | WO 00/52559 | 9/2000 |
| WO | WO 01/79970 | 10/2001 |

* cited by examiner

CONFIGURABLE ACTION GENERATION FOR A REMOTE NETWORK MANAGEMENT PLATFORM

BACKGROUND

Remote network management platforms are cloud-based computing systems that facilitate the operations of managed networks, such as those of enterprises. For instance, remote network management platforms can provide web-based and other interfaces with which an enterprise can manage its own networks, computing devices, and the software thereon.

Some of these platforms can probe networks and devices to discover the configurations thereof, and store the resulting data as configuration items in a database. From these configuration items and determined relationships therebetween, the platforms may be able to generate visual maps of application services provided by a managed network (e.g., web services and email services), identify configuration problems, and proactively warn the associated enterprise about potential security issues along many other features.

Beyond configuration items, remote network management platforms may also gather and store a wealth of operational data related to a managed network. This includes log files of user and system activities, incident reports raised by technology users, knowledgebase articles related to the managed network, pre-defined and user-defined workflows and processes, and so on.

But a significant portion of this available data goes unused because there are insufficient tools for processing it into tangible, cogent action recommendations for specific personae. Further, the disparity in the type and content of this data, even with respect to just one managed network, makes using a single analytical approach unfeasible.

SUMMARY

The embodiments herein provide an intelligent action recommendation framework that can operate on a remote network management platform. This framework can be adapted to configure and execute action recommendation generators for a wide variety of data. The result may be a particular action recommendation or set of action recommendations for a specific persona, such that the action recommendation(s) are likely to be useful or at least of interest to that persona.

To facilitate this functionality, the remote network management platform may support a number of action recommendation types, such a rule-based, machine-learning-based, process-mining-based, and decision-tree based. For a given action recommendation generator that provides an action recommendation of one of these types, conditions may be established that determine what data the action recommendation generator considers, when and how its action recommendations are generated, where the action recommendations appear, and to whom these action recommendations are presented. Further, generated action recommendations may be personalized so that they are more likely to be of use to a specific individual based on that individual's persona within the enterprise.

These embodiments are advantageous for a number of reasons. Machine learning and other model types lack generalized intelligence, and therefore often require human interaction to "suggest" a specific type (rule-based, machine-learning-based, process-mining-based, or decision-tree based) or technique thereof to fit the available input data and output requirements. Attempting to use a single model to solve a wide variety of problems has proven to not work in practice. Further, the embodiments herein guide the user through model selection, input source selection, output modality selection and execution condition selection, and so on. This allows users who might not be experts in data science to be able to develop action recommendation systems for their organizations.

Throughout the discussion herein, the term "action recommendation" may be shortened to "action" where appropriate. Thus, for example, an action recommendation engine may be referred to as an "action engine", an action recommendation generator may be referred to as an "action generator", an action recommendation type may be referred to as an "action type", and so on.

Accordingly, a first example embodiment may involve persistent storage containing configuration and operational data related to a managed network, an action configurator application, and an action execution application. The first example embodiment may also include one or more processors configured to: receive, by way of the action configurator application, a specification of an action type from a plurality of supported action types; receive, by way of the action configurator application, a specification of an input source for actions generated using the action type, wherein the input source identifies a subset of the configuration and operational data; receive, by way of the action configurator application, a specification of one or more target users and an output modality for the actions; receive, by way of the action configurator application, a specification of a condition that causes the actions to be generated; store, in the persistent storage, representations of the action type, input source, the target users, the output modality, and the condition as an action generator; determine, that the condition has been satisfied; and possibly in response to determining that the condition has been satisfied, cause the action execution application to: execute the action generator on the input source, and produce an output for one of the target users by way of the output modality.

A second example embodiment may involve receiving, by way of an action configurator application, a specification of an action type from a plurality of supported action types. The second example embodiment may also involve receiving, by way of the action configurator application, a specification of an input source for actions generated using the action type, wherein the input source identifies a subset of configuration and operational data related to a managed network. The second example embodiment may also involve receiving, by way of the action configurator application, a specification of one or more target users and an output modality for the actions. The second example embodiment may also involve receiving, by way of the action configurator application, a specification of a condition that causes the actions to be generated. The second example embodiment may also involve storing, in persistent storage, representations of the action type, input source, the target users, the output modality, and the condition as an action generator. The second example embodiment may also involve determining, that the condition has been satisfied. The second example embodiment may also involve, possibly in response to determining that the condition has been satisfied, causing an action execution application to: execute the action generator on the input source, and produce an output for one of the target users by way of the output modality.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
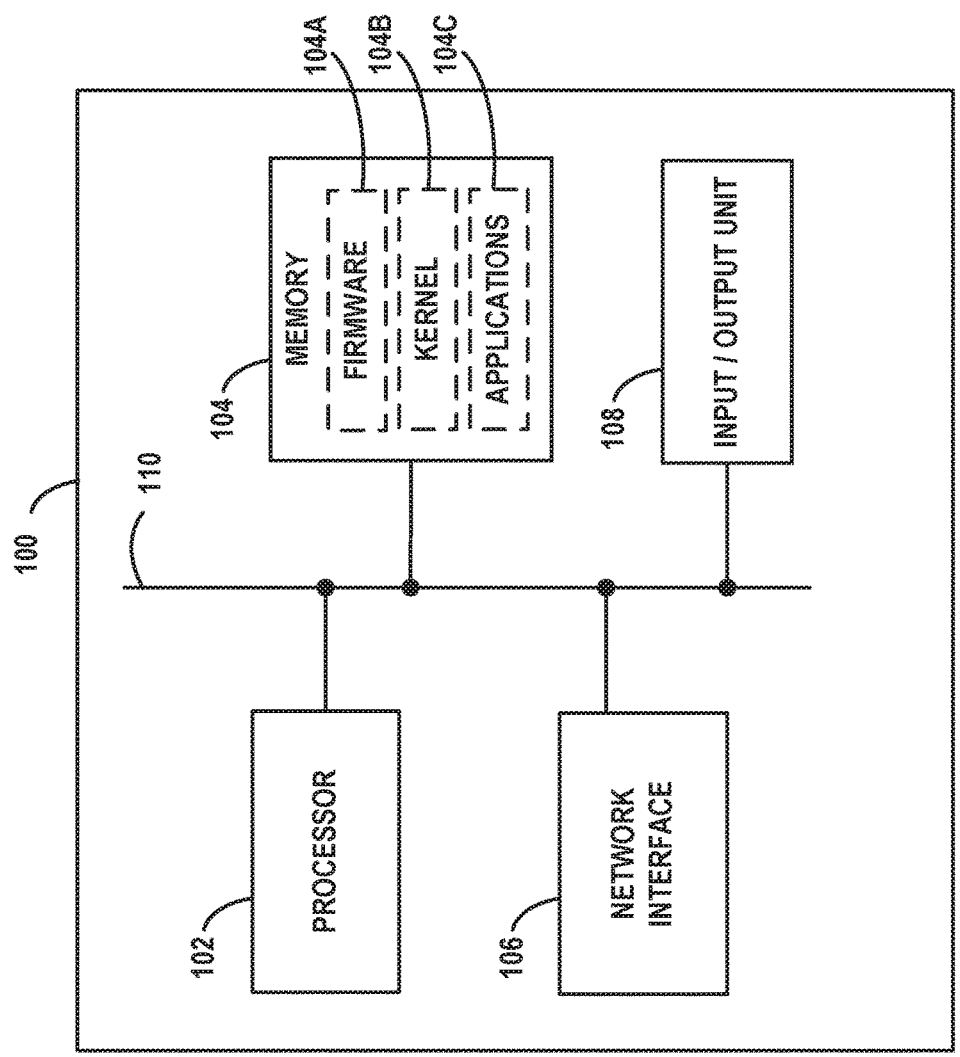
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
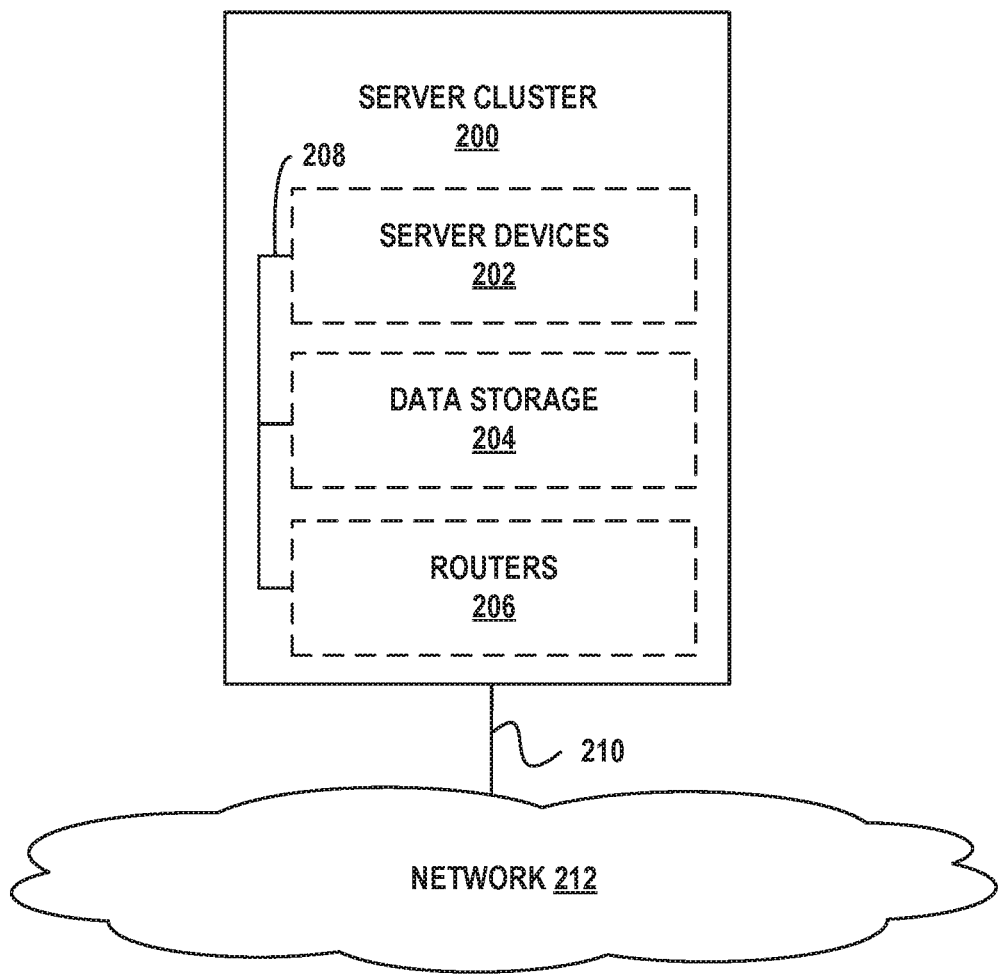
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
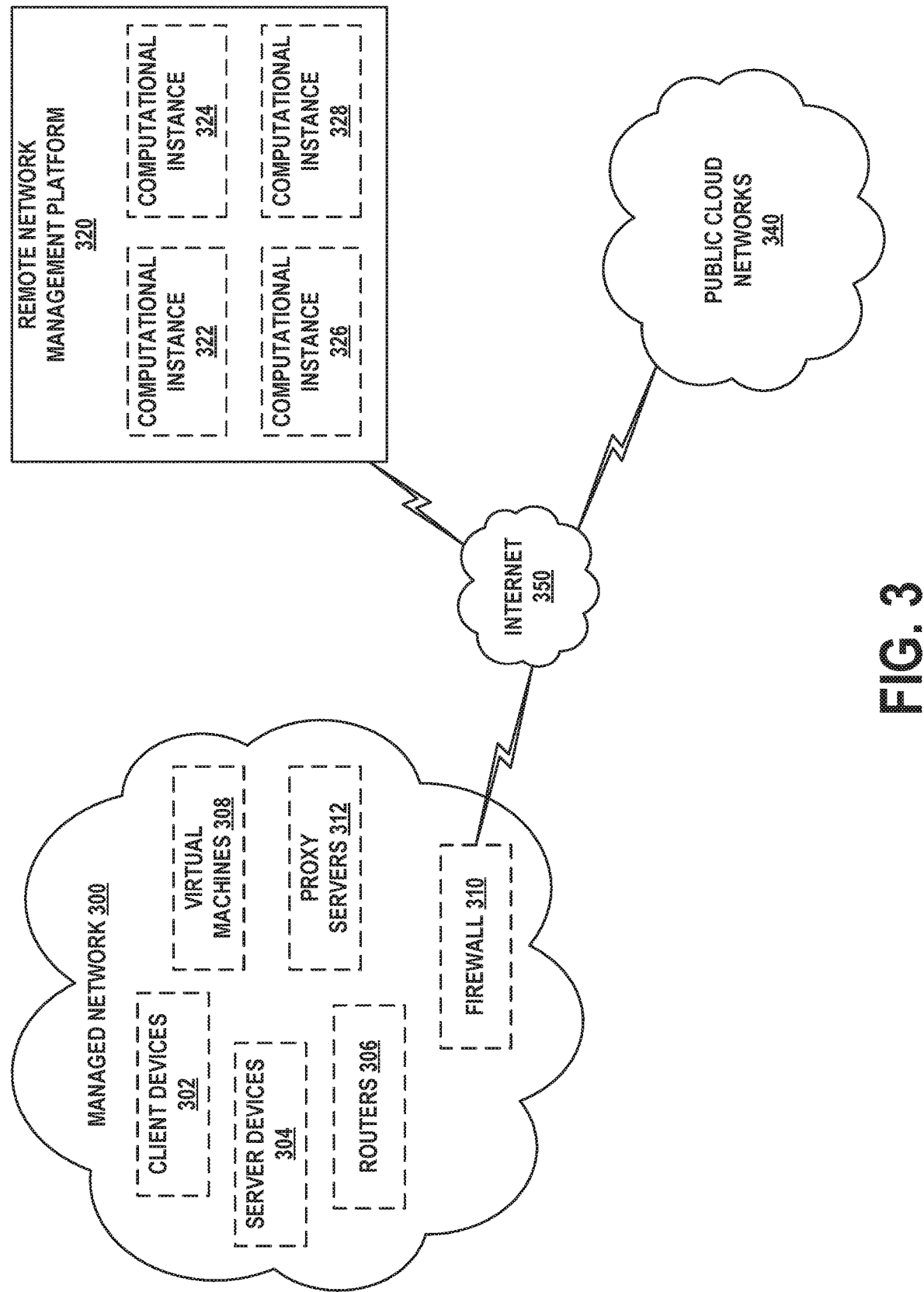
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
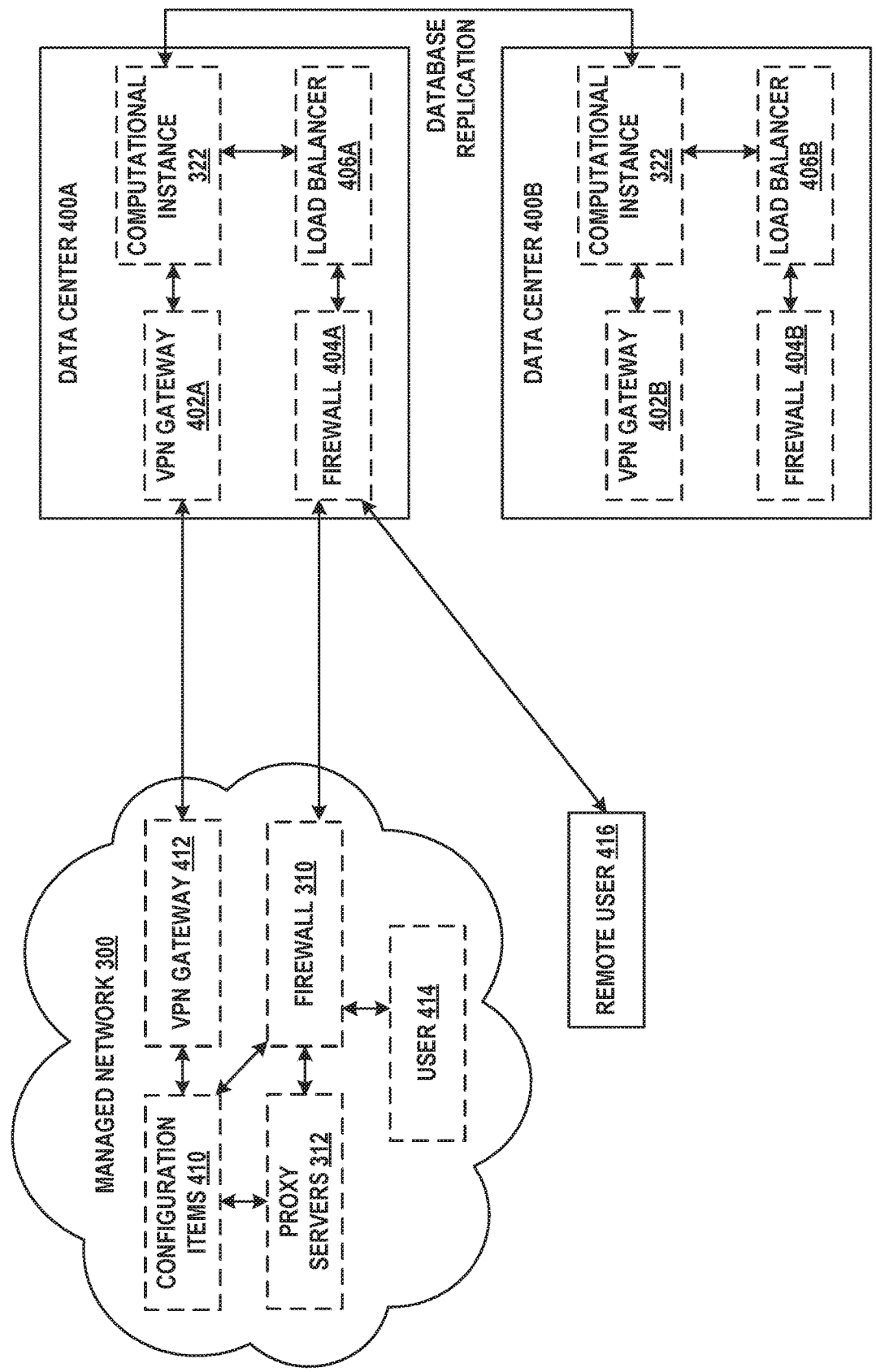
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
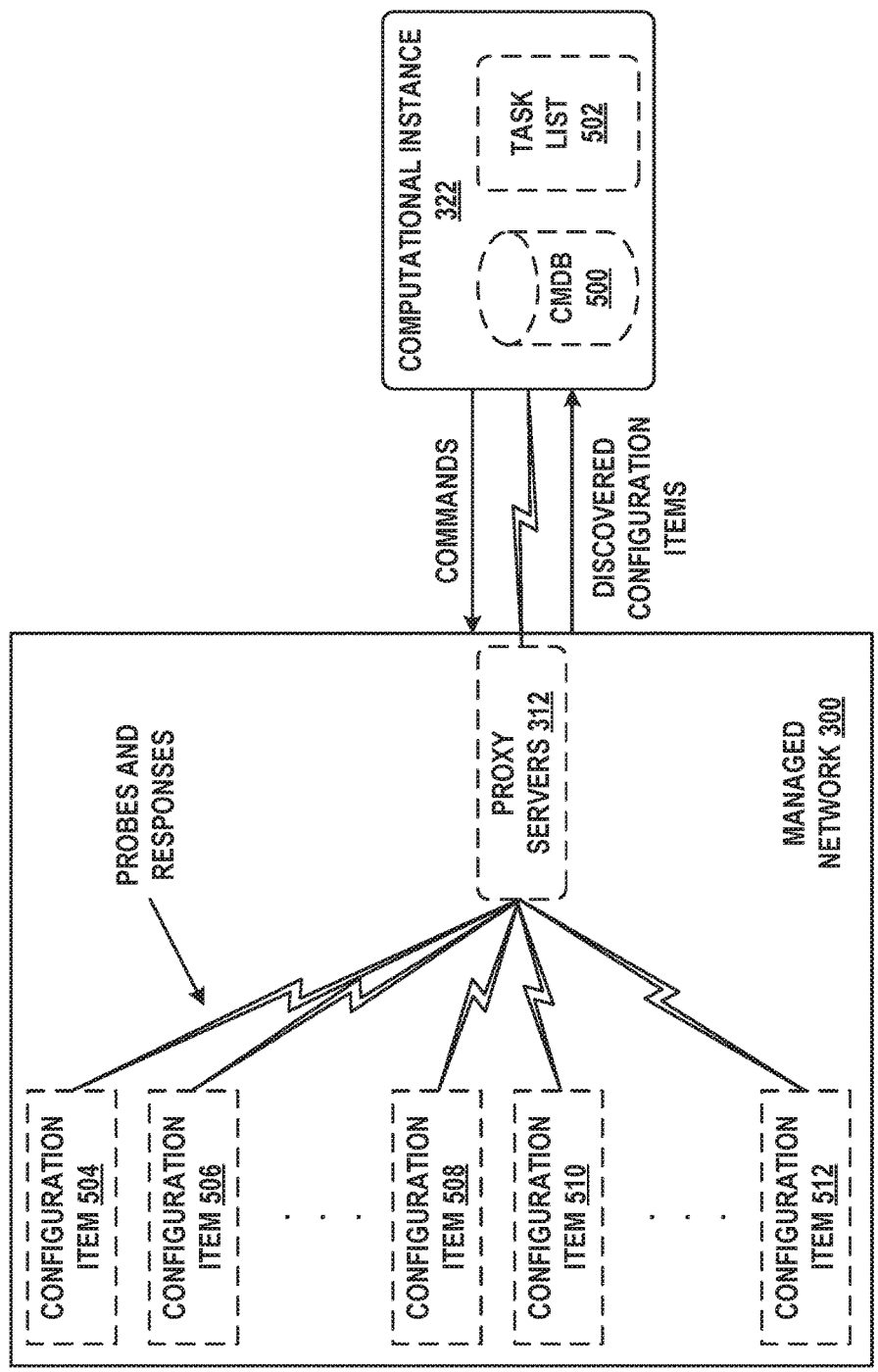
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
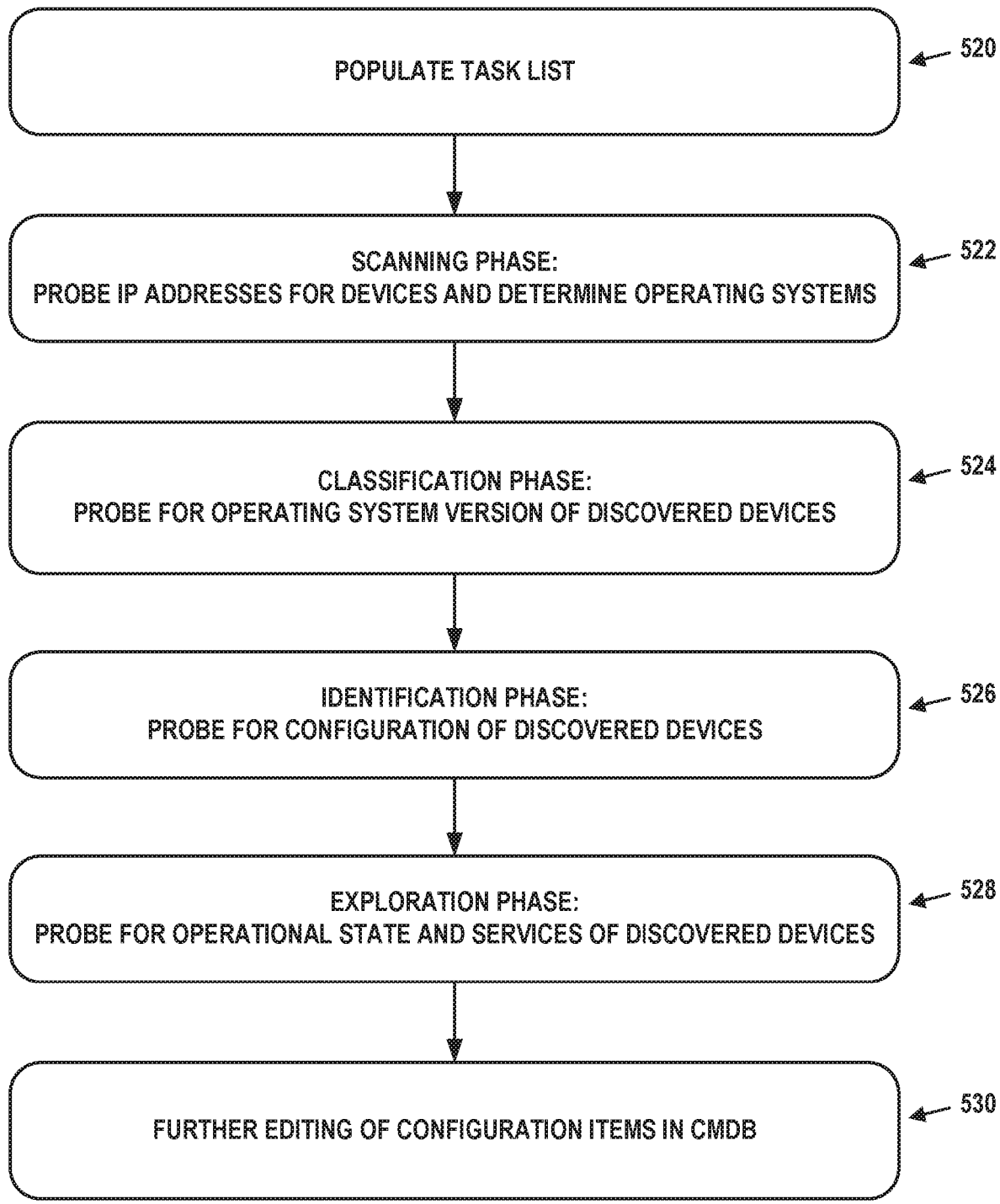
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. EXAMPLE ARCHITECTURE

Figure 6:
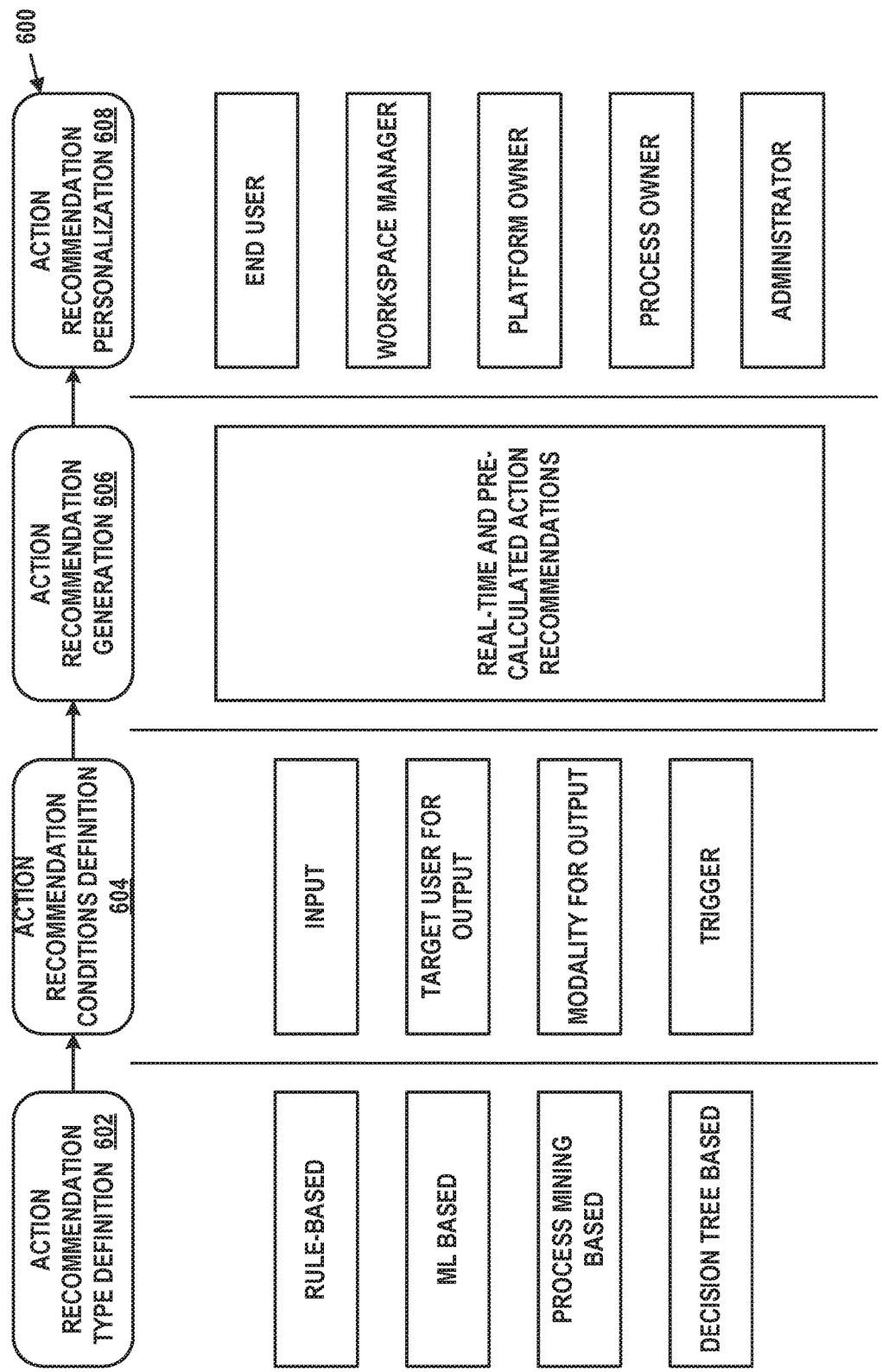
FIG. 6 depicts a procedural architecture for an action recommendation configurator, in accordance with example embodiments.

FIG. 6 depicts example procedural architecture 600 for an action recommendation configurator. It consists of four phases, but more or fewer phases may be employed. By following procedural architecture 600, an action recommendation generator can be defined, and then used with an action recommendation engine. Here, it is assumed that an action recommendation generator is a configuration of data that defines how action recommendations are to be generated and presented, while an action recommendation engine is a software application that executes an action recommendation generator to produce action recommendations. Thus, a single action recommendation engine may execute multiple action recommendation generators. Other arrangements are possible.

The first phase is action recommendation type definition 602, in which the type of action recommendation to be produced by the action recommendation generator may be defined. Example action recommendation types include rules-based, machine-learning-based (ML based), process-mining-based, and decision-tree-based action recommendations. Each of these types are described in more detail below, and each action recommendation type may be referred to as a "model" for sake of convenience. But in brief, rules-based action recommendations may use Boolean expressions, ML-based action recommendations may use a classification, similarity, or clustering engine, process-mining-based action recommendations may use database tables or log data, and decision-tree-based action recommendations may evaluate multiple variables in various orders represented as nodes in a tree.

The second phase is action recommendation conditions definition 604, in which characteristics of the input, output, and triggering of the action recommendation generator are defined. The input characteristics may be, for example, data from one or more database tables and/or predefined key performance indicators (KPIs), and may include conditions or thresholds to apply to this data. The output characteristics may specify one or more target users for the action recommendation (e.g., based on their personae, roles, permissions granted or denied in access control lists, and/or other criteria), as well as one or more modalities for presenting the action recommendations (e.g., a graphical user interface, a workspace, a chat message, a mobile interface, email, text message, etc.). The trigger characteristics may define a condition when the action recommendation generator is executed by the action recommendation engine (e.g., periodically or on-demand), and well as (if applicable) when and how frequently a model is trained or retrained. Thus, the embodiments herein may differentiate between an action recommendation condition (the former) and a model condition (the latter).

The third phase is action recommendation generation 606. In this phase, the action recommendation engine executes the action recommendation generator in order to produce an action recommendation. As noted above, this generation can take place in real time (e.g., in response to an event such as the loading of a web page or a user request) or can be pre-calculated. The operations of this phase is described in more detail below and in FIG. 7.

The fourth phase is action recommendation personalization 608. While some action recommendations produced in the third phase may be personalized to some extent, others might not. Thus, the action recommendation engine may be configured to focus the action recommendation on a particular persona (e.g., by way of one or more application programming interfaces). This persona could be an end user (an individual who uses the remote network management platform for day-to-day functions), a workspace manager (an individual who designs and maintains user interface workspaces containing a variety of tools and information), a platform owner (an individual who operates a computational instance of the remote network management platform on behalf of a managed network), a process owner (and individual who defines and maintains a process or workflow used by the managed network), or an administrator (an individual who is tasked to keeping the computational instance operating as required by the managed network).

Once an action recommendation is made, the actions taken by the persona who received the action recommendation may be tracked and the quality of the action recommendation can be evaluated. In some cases, such evaluations can be fed back into an action recommendation generator and/or the action recommendation engine in an effort to improve future action recommendations.

Figure 7:
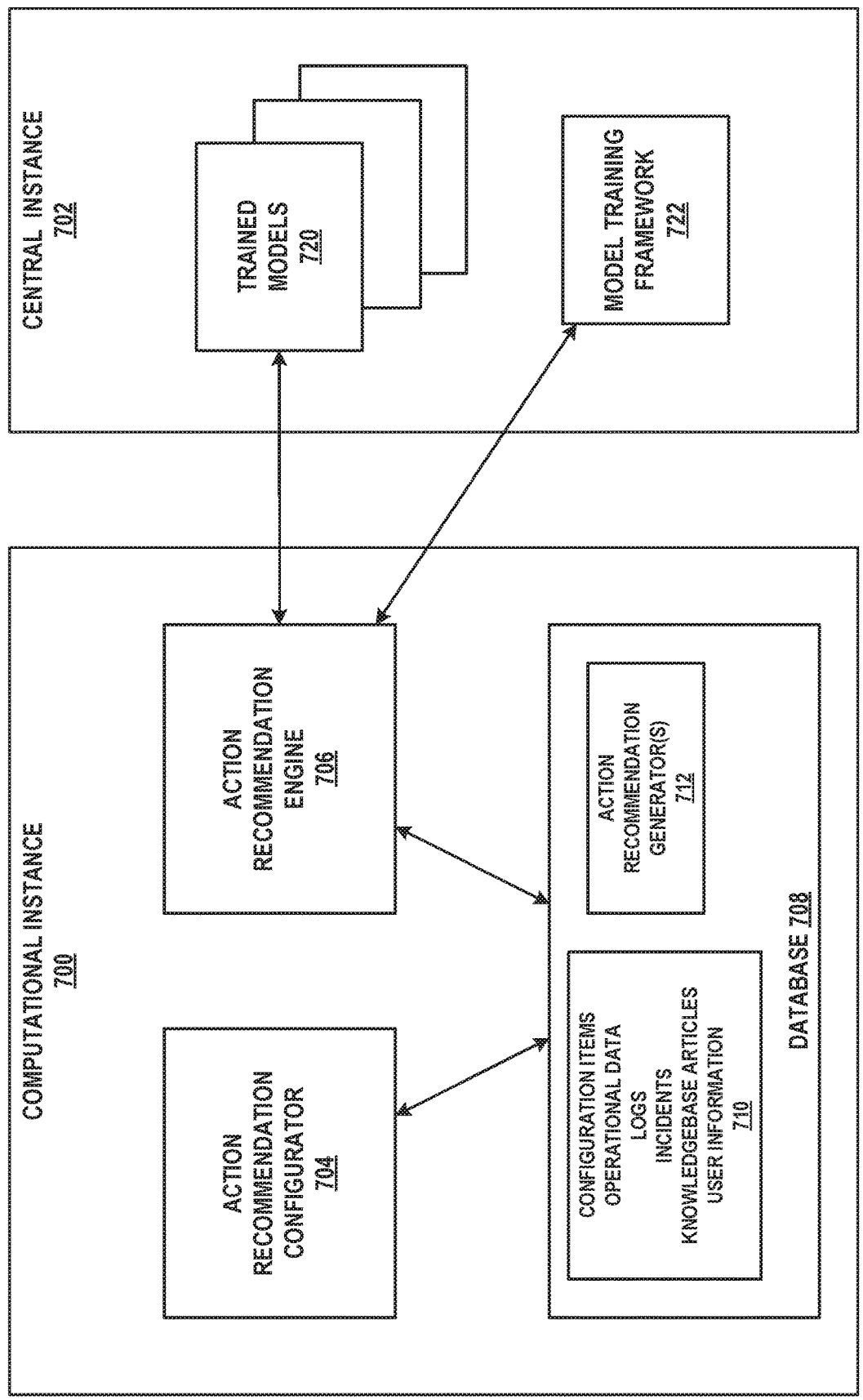
FIG. 7 depicts an action recommendation architecture of a remote network management platform, in accordance with example embodiments.

FIG. 7 is a block diagram representing the arrangement and processing of the components described above with respect to a remote network management platform. In FIG. 7, computational instance 700 and central instance 702 may be disposed within such a remote network management platform.

Not unlike computational instance 322, computational instance 700 may be a cluster of computing devices used by or dedicated to a managed network. In accordance with the discussion above, central instance 702 may be another cluster of computing devices that are used to operate aspects of the remote network management platform and/or provide specific applications and services to computational instances thereof.

Computational instance 700 may include action recommendation configurator 704, action recommendation engine 706, and database 708. In practice, computational instance 700 may also include additional modules and provide further functionality.

Action recommendation configurator 704 may be an application that allows a user to define an action recommendation generator as discussed above. In some embodiments, action recommendation configurator 704 may encompass one or more graphical user interfaces to facilitate defining action recommendation generators. Once an action recommendation generator is defined, action recommendation configurator 704 may store it in database 708 as shown.

Action recommendation engine 706 may be an application configured to execute an action recommendation generator and thereby provide action recommendations. To do so, action recommendation engine 706 may retrieve a copy of an action recommendation generator from database 708. Action recommendation engine 706 may also interact with trained models 720 and/or model training framework 722 as needed to provide these action recommendations. Although not shown, action recommendation engine 706 may store generated action recommendations in database 708 and/or display these action recommendations by way of a graphical user interface.

Database 708 may be one or more databases or database tables storing data 710 and action recommendation generator(s) 712. In some cases, database 708 may encompass or interface with a CMDB, but this might not always be the case. Data 710 may include any information used by an action recommendation generator 704 or action recommendation engine 706, including configuration items, operational data related to computational instance 700, logs, incidents, knowledgebase articles, and user information. More or less information may be in data 710. Action recommendation generator(s) 712 may include one or more action recommendation generators defined by way of action recommendation configurator 704 or defined in some other fashion. Action recommendation generator(s) 712 may contain enough information, in the form of data and/or instruction logic, so that action recommendation engine 706 can execute them to provide action recommendations. In some cases, an action recommendation generator may refer to specific units or types of information in data 710.

As noted, central instance 702 may include trained models 720 and model training framework 722. Trained models 720 may include one or more executable models (e.g., based on a neural network, decision tree, or some other technique), that have been previously trained for a specific task. Model training framework 722 may be one or more applications by way of which trained models 720 can be trained. In some embodiments, trained models 720 and/or model training framework 722 may be disposed within computational instance 700. In other embodiments, action recommendation engine 706 or part thereof may be disposed within central instance 702.

There may be advantages to placing the training and/or execution of models in central instance 702 rather than computational instance 700. Notably, computational instance 700 may be tasked with executing numerous applications for hundreds or thousands of users, and generating data-driven graphical user interface for these users. ML models, in particular, can be expensive in terms of computation and storage. Thus, to avoid causing latency across these applications and their graphical user interfaces, some or all actual processing of ML models may be placed in central instance 702.

Putting this together, consider the following scenario. An administrator uses action recommendation configurator 704 to define an action recommendation generator. This action recommendation generator produces action recommendations of knowledgebase articles for a user to read based on knowledgebase articles read by similar users. Here, user similarity may be based on one or more of the user's persona, title, or location, for example. The action recommendation generator is stored in database 708, and a model condition is added to action recommendation engine 706 so that action recommendation engine 706 trains a model, by way of model training framework 722 and using information from data 710, to perform the similarity calculations. The model condition may also cause retraining on the model on a periodic basis (e.g., once per week or once per month). Once trained, the model is stored in trained models 720. Also, an action recommendation condition is added so that an action recommendation is generated when each user logs into his or her home page in the web interface of computational instance 700

At some later point, a particular user logs into such a home page. Based on the action recommendation condition, this causes action recommendation engine 706 to look up one or more of the user's persona, title, or location. Action recommendation engine 706 may then introduce this data to the trained model to generate an action recommendation. The resulting action recommendation may be a link to one or more action recommended knowledgebase articles, perhaps with the titles of these articles.

VI. ACTION RECOMMENDATION MODEL STRUCTURE

As noted above, an action recommendation can be based on rules, ML models, process mining, decision trees, or some combination thereof. Each of these can be defined by way of action recommendation configurator 704—e.g., using graphical user interface. The following subsections describe the types of action recommendations in more detail.

A. Rules

Rules may take the form of Boolean, arithmetic, and/or propositional logic. For example, such a rule may take the form of "if (A and (B or C)) then make action recommendation D". In this case, A might represent a value in database exceeding a threshold, B might represent a particular type of user persona, and C might represent another particular type of user persona. Action recommendation D might represent an action recommendation to examine a possible root cause of the value exceeding the threshold. Clearly, more complicated relationships and scenarios can be developed. Data 710 may be arranged into specific tables used to develop rules (e.g., a table containing configuration items, a table including references to knowledgebase articles, a table include user information).

Rules allow action recommendations to be contextualized for a particular type of user persona so that these action recommendations are more relevant to that user's role. As an example involving an IT service management persona, a best practice for solving a problem of a word processing application not being able to open a certain type of file might be to use an online tool to convert the file to a supported format. Thus, the rule might detect when an employee or support agent persona has entered search terms including the name of the word processing application and the file type, and in response recommend a knowledgebase article that describes how to convert the file. In another example, a rule may detect when a customer satisfaction (CSAT) metric for a support agent or support agent group is below a threshold. The rule might provide an action recommendation to an IT manager persona that this individual or group watch a series of training videos.

Figure 8A:
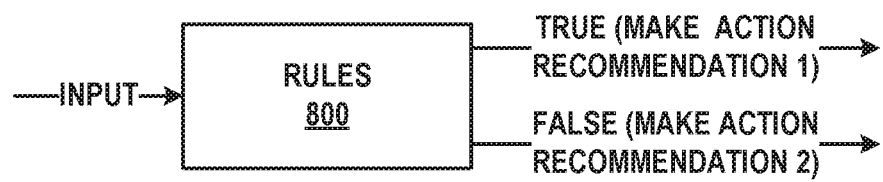
FIG. 8A depicts a rules-based action recommendation generator, in accordance with example embodiments.

FIG. 8A depicts the operation of example rules 800. These rules take one or more values of specific variables as input and produce a Boolean output. If the output is true action recommendation 1 is made, while if the output is false, action recommendation 2 is made. In some situations, one of these action recommendations may be to not make an action recommendation at all. For instance, if the output of rules 800 is false, the model might refrain from making any action recommendation.

B. ML Models

ML models may utilize the classification, similarity, and/or clustering techniques described below. But ML-based action recommendations are not limited to these techniques, and other techniques may be used. Further, there can be overlap between the functionality of these techniques (e.g., clustering techniques can be used for classification or similarity operations).

In many situations, ML-based action recommendations are made from processing text in data 710, such as incidents, knowledgebase articles, log files, and so on, and the embodiments below assume such textual records for purposes of illustration. Nonetheless, other types of data may be used as the basis for developing and using ML models.

1. Classification

Classification models are trained with supervised data sets (e.g., sets of inputs with corresponding ground truth output values). If trained with enough data that reflects clear trends, a classification model can predict the correct output value for patterns of inputs that did not appear in the training data. Classification models typically employ artificial neural networks (ANNs), but could use other techniques, such as regression, support vector machines, or Bayesian inference. Further, classification models may classify input into a binary (e.g., true/false) category, or a particular category from a pre-established set of categories (e.g., a type of an observed incident). In some cases, multiple categories can be provided (e.g., each with a corresponding estimated probability that the category is correct).

As simple example, suppose that an ANN classification model is trained with the short descriptions of 500 incident reports and corresponding indications of the categories of the incident reports. These categories may be software, hardware, network, or database. Then, the trained ANN can be used to predict the category of incoming incident reports based on their short descriptions. This could help route the incident reports to an agent who has the appropriate expertise to address the incident report.

Figure 8B:
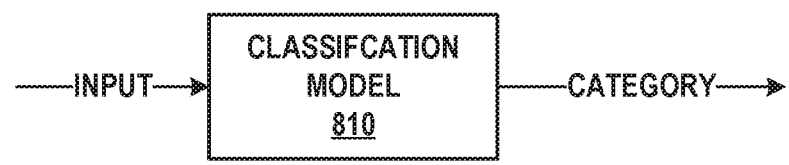
FIG. 8B depicts machine-learning-based action recommendation generators, in accordance with example embodiments.
Figure 8B:
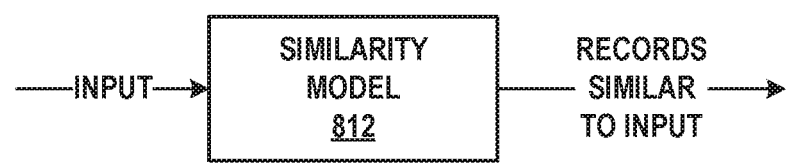
Figure 8B:
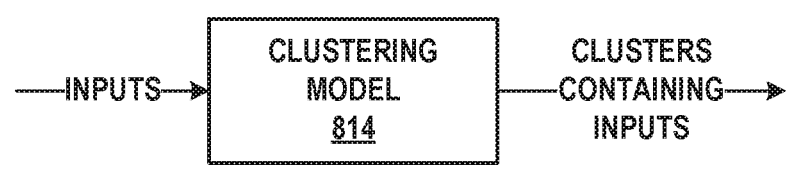

Classification model 810 of FIG. 8B depicts such an arrangement in general. Particularly, classification model 810 takes an input record and outputs a predicted category into which this record falls.

2. Similarity

The degree of similarity between two samples of text can be determined in a variety of ways. The two samples of text could be a text field of an incident report and a text field of another incident report, a knowledgebase article, or some other sample of text that may be relevant to the resolution, classification, or other aspects of an incident report. Additionally or alternatively, one or both of the samples could be segments of text within a larger sample of text. A degree of overlap between the identities of words present in the two samples of text and/or a word matrix method could be used to determine the degree of similarity. Additionally or alternatively, one or more techniques of natural language processing could be applied to compare the samples of text such that the context or other semantic content of the texts affects the determined similarity value between the samples of text.

Such techniques may be applied to improve text query matching of input text. These techniques may include a variety of ML algorithms that can be trained based on samples of text. The samples of text used for training can include past examples of incident reports, knowledgebase articles, or other text samples of the same nature as the text samples to which the trained model will be applied. This has the benefit of providing a model that has been uniquely adapted to the vocabulary, topics, and idiomatic word use common in its intended application.

Such techniques can include determining word and/or paragraph vectors from samples of text, ANNs or other deep learning algorithms, performing sentiment analysis, or other techniques in order to determine a similarity between samples of text, to group multiple samples of text together according to topic or content, to partition a sample of text into discrete internally-related segments, to determine statistical associations between words, or to perform some other language processing task.

A "word vector" may be determined for each word present in a corpus of text records such that words having similar meanings (or "semantic content") are associated with word vectors that are near each other within a semantically encoded vector space. Such vectors may have dozens, hundreds, or more elements and thus may be an n-space where n is a number of dimensions. These word vectors allow the underlying meaning of words to be compared or otherwise operated on by a computing device (e.g., by determining a distance, a cosine similarity, or some other measure of similarity between the word vectors). Accordingly, the use of word vectors may allow for a significant improvement over simpler word list or word matrix methods. Additionally or alternatively, the word vectors may be provided as input to an ANN, a support vector machine, a decision tree, or some other machine learning algorithm in order to perform sentiment analysis, to classify or cluster samples of text, to determine a level of similarity between samples of text, or to perform some other language processing task.

Despite the usefulness of word vectors, the complete semantic meaning of a sentence or other passage (e.g., a phrase, several sentences, a paragraph, a text segment within a larger sample of text, or a document) cannot always be captured from the individual word vectors of a sentence (e.g., by applying vector algebra). Word vectors can represent the semantic content of individual words and may be trained using short context windows. Thus, the semantic content of word order and any information outside the short context window is lost when operating based only on word vectors.

Similar to the methods above for learning word vectors, an ANN or other ML models may be trained using a large number of paragraphs in a corpus to determine the contextual meaning of entire paragraphs, sentences, phrases, or other multi-word text samples as well as to determine the meaning of the individual words that make up the paragraphs in the corpus. For example, for each paragraph in a corpus, an ANN can be trained with fixed-length contexts generated from moving a sliding window over the paragraph. Thus, a given paragraph vector is shared across all training contexts created from its source paragraph, but not across training contexts created from other paragraphs.

Word vectors and paragraph vectors are two approaches for training an ANN model to represent the sematic meanings of words. Other techniques, such as bidirectional encoder representations from transformers (BERT), may be used for example. These techniques may be combined with one another or with other techniques.

Similarity model 812 of FIG. 8B depicts such an arrangement in general. Particularly, similarity model 812 takes an input record and outputs one or more other records which are predicted to be similar to the input record.

3. Clustering

Textual and/or non-textual records can be clustered together. Such clustering may be performed to provide a variety of benefits. For example, clustering may be applied to a set of incident reports in order to identify patterns or groups within the set of reports that have relevance to the operation of a system or organization. Such groups may facilitate the tracking of ongoing problems (e.g., network outages, user confusion interfacing with a network-based service) by measuring a time-dependence of records assigned to a particular cluster associated with the ongoing problem(s). Such groups may facilitate the early identification of newly-emerging problems by, e.g., identifying similarities between newly-received reports. In some examples, clustering may allow similar reports (e.g., reports corresponding to the same cluster(s)) to be manipulated in common, in order to reduce the time required to respond to sets of similar reports. For example, reports that are related to a network outage and that are assigned to a single cluster could all be resolved in a single operation following resolution of the network outage.

Clustering may be performed in an unsupervised manner in order to generate clusters without the requirement of manually-labeled records, to identify previously unidentified clusters within the training data, or to provide some other benefit. A variety of methods and/or ML algorithms could be applied to identify clusters within a set of records and/or to assign records (e.g., newly received or generated records) to already-identified clusters. For example, decision trees, ANNs, k-means, support vector machines, independent component analysis, principal component analysis, or some other method could be trained based on a set of available records in order to generate an ML model to classify the available records and/or to classify records not present in the training set of available records.

Once an ML model has been determined, the ML model can be applied to assign additional records to the identified clusters represented by the ML model and/or to assign records to a set of residual records. The ML model could include parameter values, neural network hyperparameters, cluster centroid locations in feature space, cluster boundary locations in feature space, threshold similarity values, or other information used, by the ML model, to determine which cluster to assign a record and/or to determine that the record should not be assigned to a cluster (e.g., should be stored in a set of residual, unassigned records). Such information could define a region, within a feature space, that corresponds to each cluster. That is, the information in the ML model could be such that the ML model assigns a record to a particular cluster if the features of the record correspond to a location, within the feature space, that is inside the defined region for the particular cluster. The defined regions could be closed (being fully enclosed by a boundary) or open (having one or more boundaries but extending infinitely outward in one or more directions in the feature space).

Clustering model 814 of FIG. 8B depicts such an arrangement in general. Particularly, clustering model 814 takes a number of input records and outputs a set of clusters generated so that similar instances of the input records are within the same cluster.

C. Process Mining

Process mining models involve defined processes and/or workflows carried out by users and/or applications related to a managed network. These processes may include a set of states and transitions between these states. A computational instance may guide users through such a process by prompting users involved in the process to update the state of the process when appropriate, and ensuring that only defined transitions between states are followed.

Figure 8C:
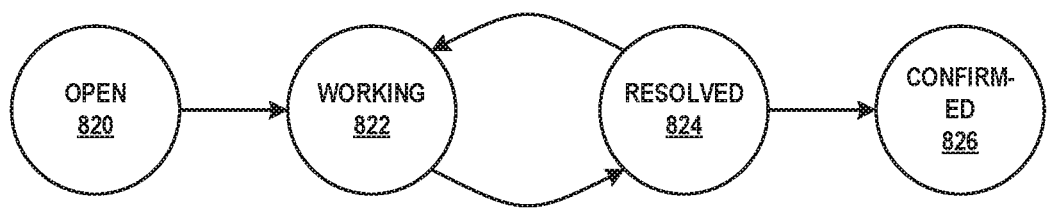
FIG. 8C depicts a process-mining-based action recommendation generator, in accordance with example embodiments.

As an example, FIG. 8C depicts a process for handling of incidents in the managed network. As noted, incidents may be tickets opened by technology users when they encounter difficulties with hardware or software (e.g., a forgotten password, an inability to log on to a VPN, applications crashing, and so on). These incidents may have priorities associated therewith, such as critical, high, medium, and low.

The process in FIG. 8C is simplified for purpose of illustration, and thus only contains four states. In practice, incident management processes may include more states and transitions.

A when a new incident is opened, it is placed in open state 820. The incident remains in this state until a technician places the incident in working state 822, to indicate that the technician has begun working on the incident. When the technician believes that he or she has resolved the incident, the technician places the incident in resolved state 824. Once the opener of the incident or some other party confirms that the incident has been resolved, the incident is placed in confirmed state 826. If the incident is not resolved, it may be placed back into working state 822.

Each time an incident is created or changes state, a log entry may be created in the computational instance. This log entry may be written to data 710 (e.g., to a file or database table), for example. The log entry may identify the incident, the associated event (e.g., creation or state transition), the entity who triggered the event (e.g., the user who created the incident or the technician who causes the state transition), and/or the time that the entry was written.

Analytics may be performed on these entries. Continuing with the example of FIG. 8C, there may be a service-level agreement (SLA) between an IT department and the rest of managed network that incidents of a critical priority spend no more than one hour in open state 820 before being transitioned to working state 822, and no more than six hours in working state 822 before being transitioned to resolved state 824. From the log entries, compliance with this SLA—or various other SLAs, internal goals, or key performance indicators (KPIs) for that matter—can be evaluated.

Thus, for instance, if the average time that critical incidents spend in open state 820 is 47 minutes, but the average time that critical incidents spend in working state 822 is 7.5 hours, then the model can make action recommendations to ameliorate the latter SLA violation. These action recommendations may include training programs for technicians, or the hiring of more technicians for peak-hours support. If the analytics determines that a particular technician is consistently outside of the SLA with his or her work, this individual may be identified to their managers as someone who needs particular attention.

D. Decision Trees

A decision tree is a branching arrangement of questions about input data that, when answered, result in a prediction of a characteristic of the input data. Thus, a decision tree could be used as a classifier, for example. Decision trees can be constructed in an iterative or recursive fashion.

In short, a decision tree maps the values of input features to values of output characteristics using a tree-like structure. Branching points can be found in a greedy fashion based on the entropy or Gini index of the training data. Branches that are most likely to direct the traversal toward relevant features (features that have more impact on the output characteristics) are placed higher in the tree. In practical embodiments, the depth, number of splits per node, or total number of leaf nodes may be constrained so that each tree is more tractable. Using randomization or by varying parameters, multiple decision trees may be generated for a given data set (e.g., a random forest or gradient-boosting model).

As an example, results from subsets of the decision trees may be added together so that a loss function is minimized. After calculating the loss function for a given subset of tree, a gradient descent procedure is invoked to add a new tree to the model that reduces the loss (i.e., follows the gradient). This can be accomplished by parameterizing the tree, then modifying the parameters of the tree and moving in the right direction by reducing the residual loss.

Figure 8D:
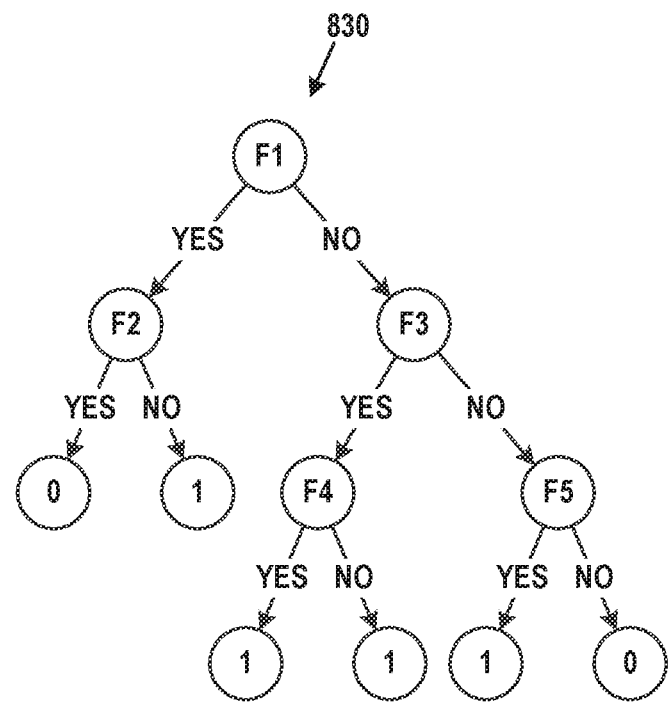
FIG. 8D depicts a decision-tree-based action recommendation generator, in accordance with example embodiments.

As a simplified example, FIG. 8D provides decision tree 830, which acts as a binary classifier. Input features F1, F2, F3, F4, and F5 are represented as the nodes of the tree. In decision tree 830, all features are present, but in some trees one or more features can be omitted.

Decision tree 830 can be interpreted as follows. There are two edges extending from each node, one labelled "yes" and the other labelled "no". If the feature represented by the node is present in the input, the "yes" edge is traversed, and if the feature represented by the node is not present in the input, the "no" edge is traversed. All leaf nodes are labelled with binary values, 0 or 1. Upon traversal of a tree for a given set of input features, the value of leaf node that is reached represents the result of the binary classification (i.e., 0 or 1). As an example, suppose that features F1 and F3 are present in the input, but features F2 and F4 are not. Then, traversal of decision tree 830 will include the nodes labelled with F1 and F2. From the node labelled with F2, the "no" edge will be taken, resulting in an output of 1.

As described above, the results from a number of these trees can be added together so that the loss function is minimized, then a new tree further reducing the loss function may be generated. This process continues for some number of iterations until the results converge.

VII. EXAMPLE ACTION RECOMMENDATIONS AND CONFIGURATOR GRAPHICAL USER INTERFACES

Figure 9:
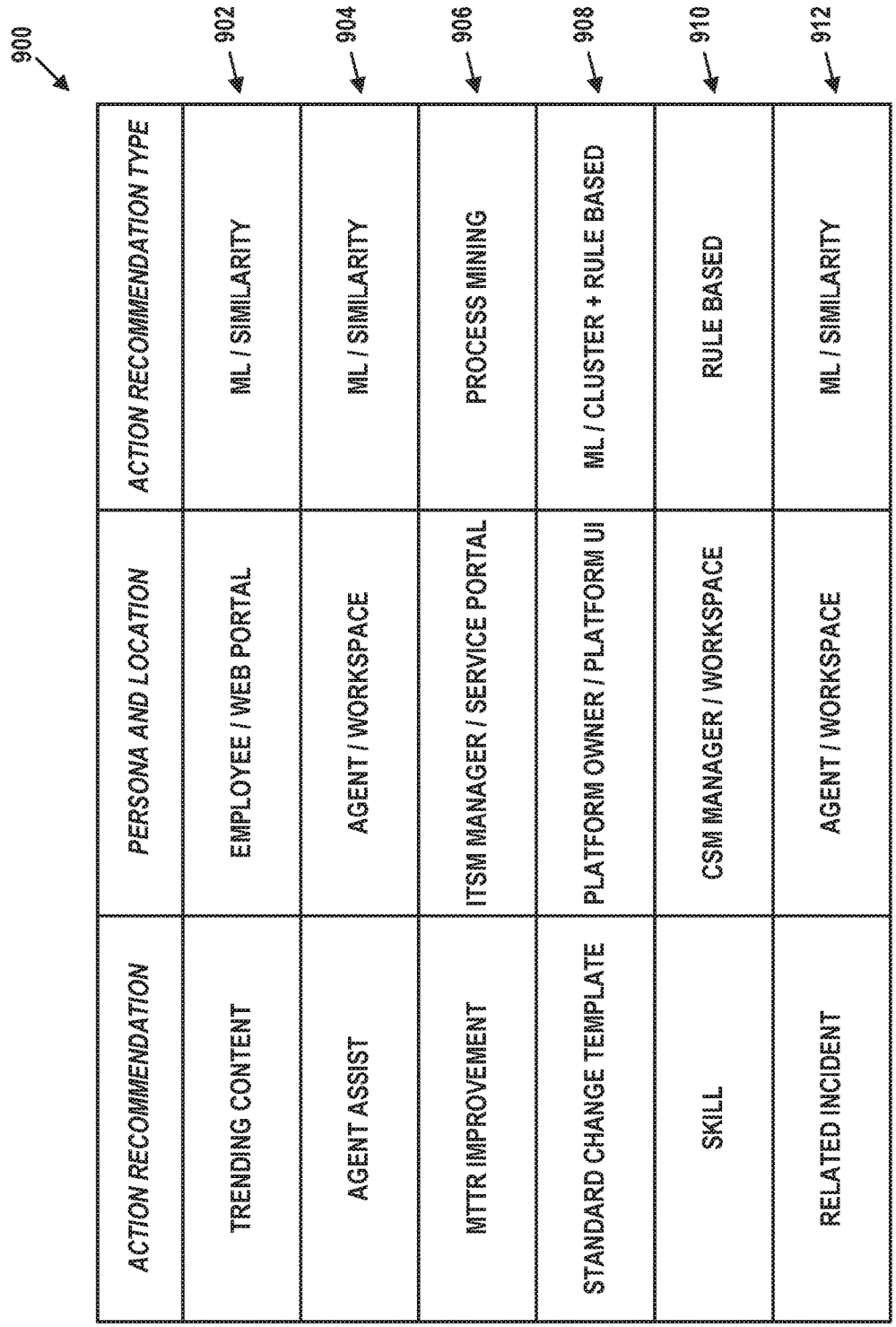
FIG. 9 is a table of action recommendations, associated personae, associated locations for display, and associated action recommendation types, in accordance with example embodiments.

As noted, various types of action recommendation generators can be developed using rules, ML models, process mining, decision trees, or a combination thereof. Some practical examples of action recommendation generators are show in Table 900 of FIG. 9.

Entry 902 is for a trending content action recommendation generator. This generator can be used for any employee of a managed network and provides action recommendations on that employee's web portal. The web portal may be a web interface served by way of the managed network's computational instance. The trending content action recommendation generator uses an ML-based similarity model to identify and display content that is popular amongst other similarly-situated employees (e.g., similar personae, roles, locations, etc.).

Entry 904 is for an agent assist action recommendation generator. This generator can be used for an IT technician or agent that addresses incidents reported by technology users of a managed network. The action recommendations may be provided on the agent's workspace, which may be a web interface through which the agent is assigned and works on the incidents. The web interface may be served by way of the managed network's computational instance. The agent assist action recommendation generator also uses an ML-based similarity model, but to identify and display suggestions of possible solutions to the incidents.

Entry 906 is for a mean-time-to-resolution (MTTR) improvement action recommendation generator. This generator can be used for an ITSM manager who is responsible for the performance of IT services within a managed network. The action recommendations may be provided on that manager's service portal, which may be a web interface served by way of the managed network's computational instance. The MTTR improvement action recommendation generator may use a process mining model to identify KPIs or other metrics that indicate performance that is below expectations.

Entry 908 is for a standard change template action recommendation generator. This generator can be used for a platform owner (e.g., a person or persons who is in charge of overall operations of a computational instance with respect to its managed network). The action recommendations may be provided on the platform owner's overall platform user interface, which may be a web interface on the computational instance. The standard change template action recommendation generator may use a combination of an ML-based clustering model and a rule-based model to identify commonalities in change requests submitted by users that could benefit from a standard template.

Entry 910 is for a skill action recommendation generator. This generator can be used by a customer service management (CSM) manager. The action recommendations may be provided on the manager's workspace, which may be a web interface on a computational instance. The skill action recommendation generator may use a rule-based model to identify customer service agents who might benefit from training in a particular skill area.

Entry 912 is for a related incident action recommendation generator. This generator can be used for an IT technician or agent that addresses incidents reported by technology users of a managed network. The action recommendations may be provided on the agent's workspace, which may be a web interface through which the agent is assigned and works on the incidents. The web interface may be served by way of the managed network's computational instance. The related incident action recommendation generator uses an ML-based similarity model to identify and display incidents that are possibly related to an incident that the agent is currently viewing.

Notably, these are just some examples of action recommendation generators that can be defined by the embodiments herein. Other examples are possible.

Regardless of the specifics of any action recommendation generator being defined, an action recommendation configurator may employ one or more graphical user interfaces to facilitate the definition of an action recommendation generator. Particularly, such a graphical user interface may guide even a non-expert user through the creation of an action recommendation generator in an intuitive and effective fashion. To that point, the definition of each action recommendation generator may be broken up into several logical steps.

Figure 10:
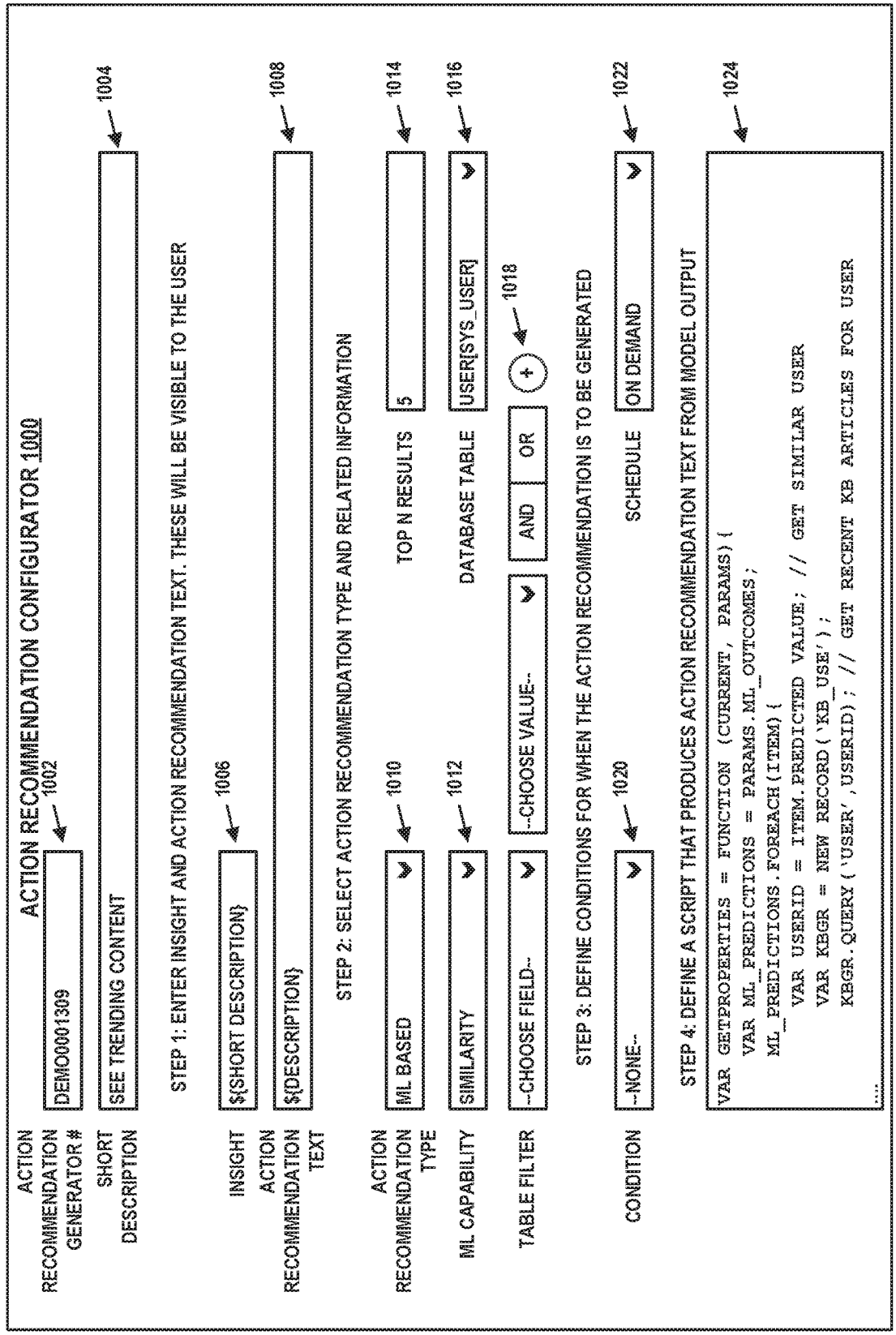
FIG. 10 depicts a graphical user interface for configuration of a machine-learning-based action recommendation generator, in accordance with example embodiments.

As first example, FIG. 10 depicts action recommendation configurator 1000 for an ML-based similarity model that makes action recommendations based on trending content. Action recommendation configurator 1000 includes a number of graphical elements, such as text boxes, selectors, drop down menus, expression specifiers, and so on.

Element 1002 is a text box that provides a unique number or identifier of the action recommendation generator. This number may be provided automatically by the action recommendation configurator so that it is unique across all action recommendation generators. Thus, the number might not be editable by the user.

Element 1004 is a text box containing a short description of the action recommendation generator. The user may enter a free form text description in this text box.

Element 1006 is a text box containing an "insight"—a title for the action recommendation when it appears to a user. For this example, the insight is a reference to the value of element 1004.

Element 1008 is a text box containing the action recommendation text or text related thereto. For this example, the action recommendation text is a reference to the output of the script in text box 1024 (see below).

Element 1010 is a drop-down menu specifying the action recommendation type. This menu may indicate, for example, that the action recommendation type is rule-based, ML-based, process-mining-based, or decision-tree-based. Here, element 1010 indicates that the action recommendation type is machine-learning-based.

Elements 1012 and 1014 are displayed because "ML based" is selected for element 1010. Element 1012 is a drop-down menu specifying the ML capability, for example, classification, similarity, or clustering, and element 1014 is a text box specifying the number of results to return.

Element 1016 is a drop-down menu specifying the database table containing the data that is to be used in the similarity calculations. Although not shown, action recommendation configurator 1000 could also include a further element allowing the user to specify a particular similarity model.

Elements 1018 can be used to define a filter that potentially reduces the extent of entries in the database table of element 1016 for which the action recommendation is generated. For example, elements 1018 can be used to define a filter expression so that action recommendations are only generated for users with a particular persona or role.

Element 1020 is a drop-down menu that allows the user to specify an optional condition that needs to be true in order for the action recommendation to be generated. No such condition is specified in action recommendation configurator 1000.

Element 1022 is a drop-down menu that allows the user to specify a schedule for when the action recommendation is to be generated. In action recommendation configurator 1000, this element has a value of "on demand", indicating that the action recommendation is generated in response to a request to do so (e.g., a request triggered when a web page is loaded or displayed).

Element 1024 is a text box that allows a user to enter program code in the form of a script. This code may be executed on the results generated by execution of the ML model. While only part of a functioning script is shown in FIG. 10, the full script may be arranged to receive a list of users similar to the input user provided to the ML model, query one or more further database tables for recent knowledgebase articles, item requests, and/or items viewed by these similar users, and provide the results in the ${description} variable shown in element 1008.

Figure 11:
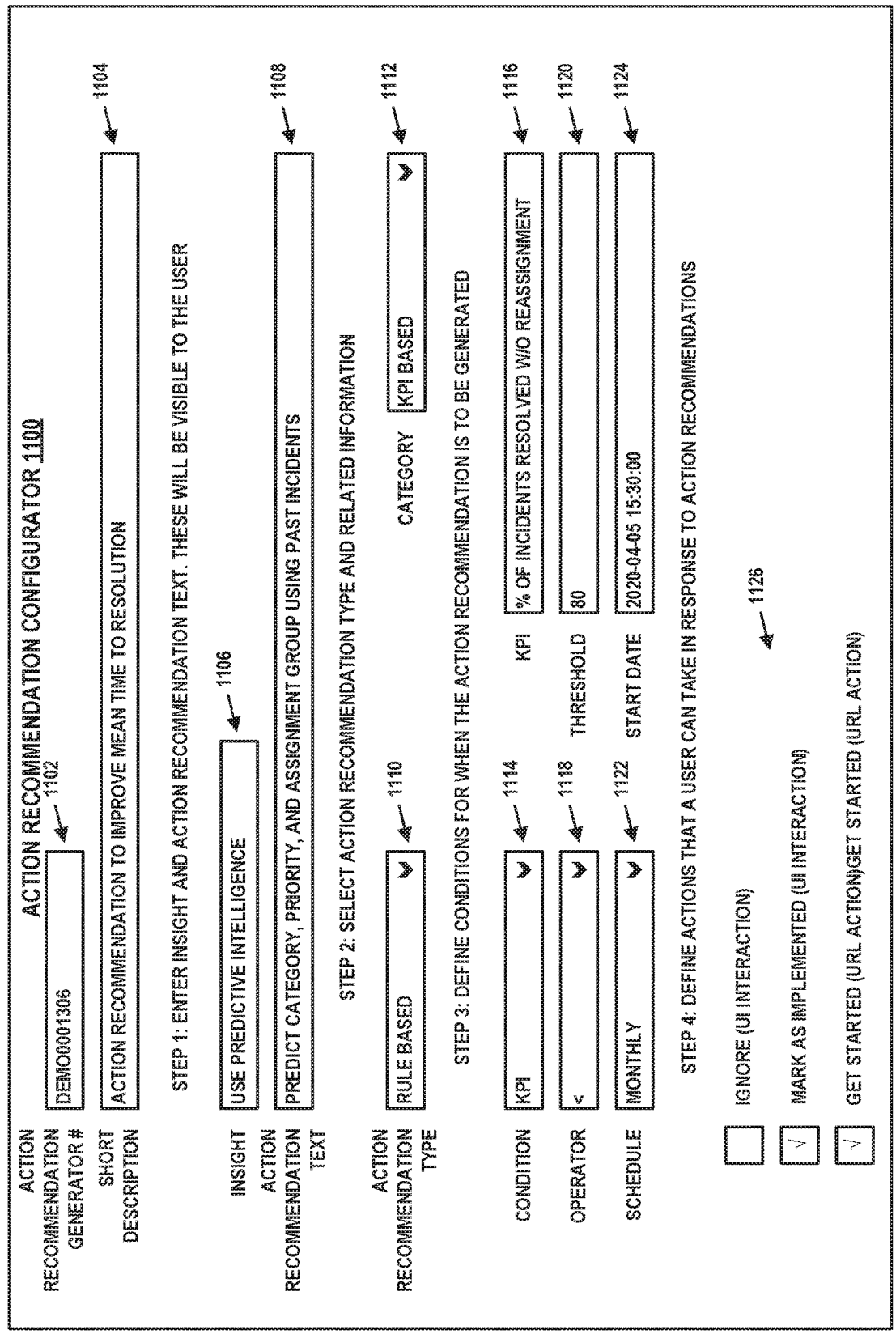
FIG. 11 depicts a graphical user interface for configuration of a rule-based action recommendation generator, in accordance with example embodiments.

As second example, FIG. 11 depicts action recommendation configurator 1100 for a rules-based model that makes action recommendations on how to reduce MTTR. Action recommendation configurator 1100 also includes a number of graphical elements, such as text boxes, selectors, drop down menus, expression specifiers, and so on.

Element 1102 is a text box that provides a unique number or identifier of the action recommendation generator. This number may be provided automatically by the action recommendation configurator so that it is unique across all action recommendation generators. Thus, the number might not be editable by the user.

Element 1104 is a text box containing a short description of the action recommendation generator. The user may enter a free form text description in this text box.

Element 1106 is a text box containing an "insight"—a title for the action recommendation when it appears to a user. For this example, the insight informs the user that using predictive intelligence may be able to reduce MTTR.

Element 1108 is a text box containing the action recommendation text or text related thereto. For this example, the action recommendation text informs the user that the categories, priorities, and assignment groups of past incidents can be used to predict the category, priority, and assignment group of a new incident.

Element 1110 is a drop-down menu specifying the action recommendation type. This menu may indicate, for example, that the action recommendation type is rule-based, ML-based, process-mining-based, or decision-tree-based. Here, element 1110 indicates that the action recommendation type is rule-based.

Element 1112 is displayed because "rule based" is selected for element 1110. Element 1112 is a drop-down menu specifying the basis for the rules, for example, KPIs or records. Notably, "KPI based" is selected.

Elements 1114, 1116, 1118, and 1120 define the condition that triggers execution of the action recommendation. This condition is that a KPI (element 1114) that represent the percentage of incidents resolved without reassignment (element 1116) is less than (element 1118) 80% (element 1120). Elements 1122 and 1124 specify that the condition of elements 1114, 1116, 1118, and 1120 is evaluated monthly, with a particular starting date.

Finally, element 1126 specifies actions that a user can take in response to receiving an action recommendation (e.g., responses that can be made by way of a web-based interface). Here, the user can mark the action recommendation as implemented or indicate that he or she would like to get started using the action recommendation. These two actions are available because the associated boxes are checked. The ignore box is not checked, so that option is not available to the user.

Figure 12:
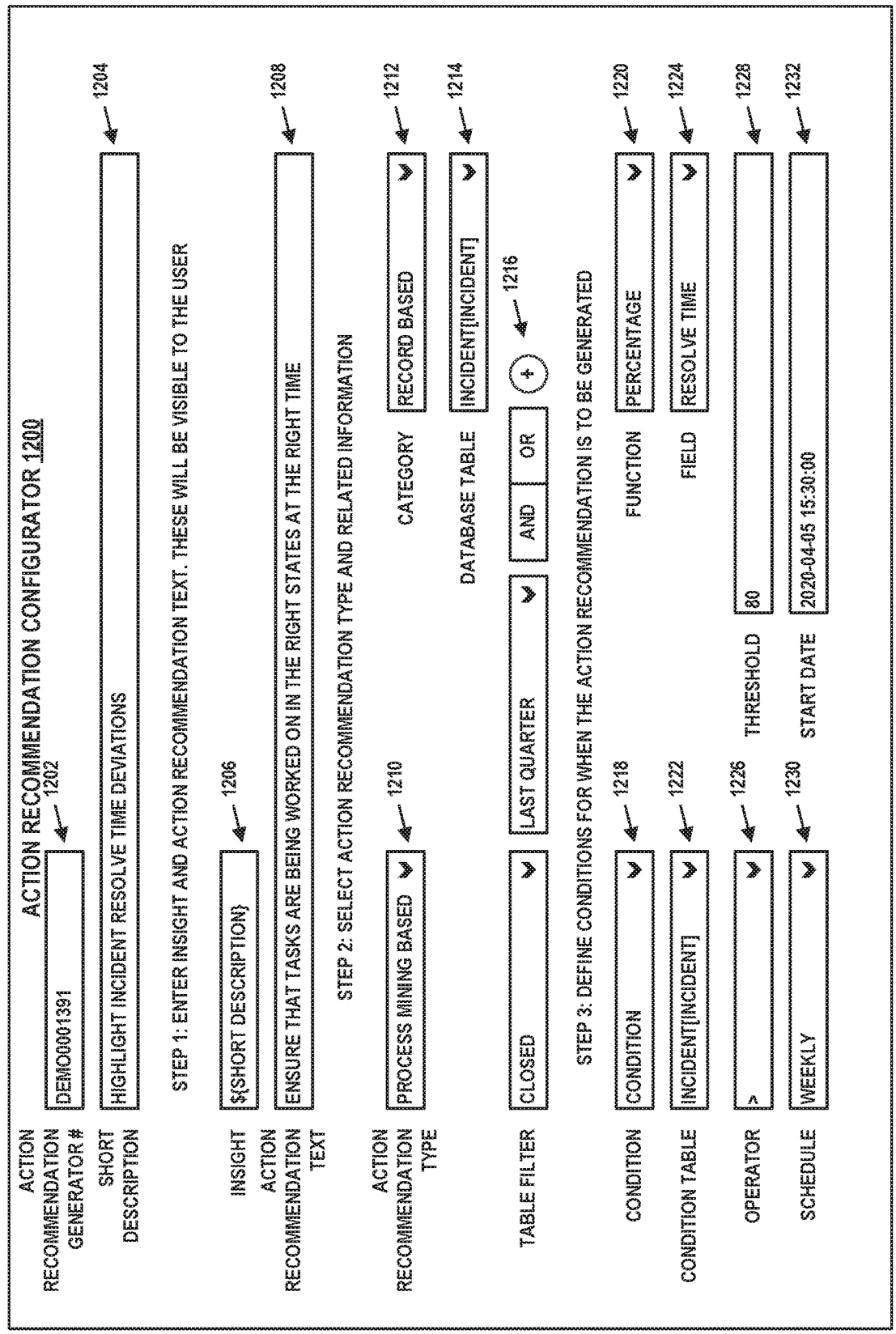
FIG. 12 depicts a graphical user interface for configuration of a process-mining-based action recommendation generator, in accordance with example embodiments.

As third example, FIG. 12 depicts action recommendation configurator 1200 for a process-mining-based model that makes action recommendations to identify when incidents are spending the more than a threshold amount of being resolved. Action recommendation configurator 1200 also includes a number of graphical elements, such as text boxes, selectors, drop down menus, expression specifiers, and so on.

Element 1202 is a text box that provides a unique number or identifier of the action recommendation generator. This number may be provided automatically by the action recommendation configurator so that it is unique across all action recommendation generators. Thus, the number might not be editable by the user.

Element 1204 is a text box containing a short description of the action recommendation generator. The user may enter a free form text description in this text box.

Element 1206 is a text box containing an "insight"—a title for the action recommendation when it appears to a user. For this example, the insight is a reference to the value of element 1204.

Element 1208 is a text box containing the action recommendation text or text related thereto. For this example, the action recommendation text informs the user that the action recommendation is related to ensuring that tasks are being worked on in the right states at the right times.

Element 1210 is a drop-down menu specifying the action recommendation type. This menu may indicate, for example, that the action recommendation type is rule-based, ML-based, process-mining-based, or decision-tree-based. Here, element 1210 indicates that the action recommendation type is process-mining-based.

Elements 1212 and 1214 are displayed because "process mining based" is selected for element 1210. Element 1212 is a drop-down menu specifying the basis for the rules, for example, KPIs or records. Notably, "record based" is selected. Element 1214 is a drop-down menu specifying a database table in which to find the records. The incident table is selected.

Elements 1216 can be used to define a filter that potentially reduces the extent of entries in the database table of element 1214 for which the action recommendation is generated. For example, elements 1216 can be used to define a filter expression so that action recommendations are only generated for incidents that were closed in the last quarter.

Elements 1218, 1220, 1222, 1224, 1226, and 1228 specify a condition that determines when an action recommendation is generated. Particularly, the action recommendation is generated for incidents with a "resolve time" exceeding the 80% percentile of all incidents in the table that satisfy the filter of elements 1216. The resolve time may be defined at the amount of time between when the incident is opened and the incident is closed. This allows an ITSM manager, for example, to identify exceptions amongst the incidents that are taking a long time to be closed. Elements 1230 and 1232 indicated that condition is to be checked weekly with a particular starting date.

Figure 13:
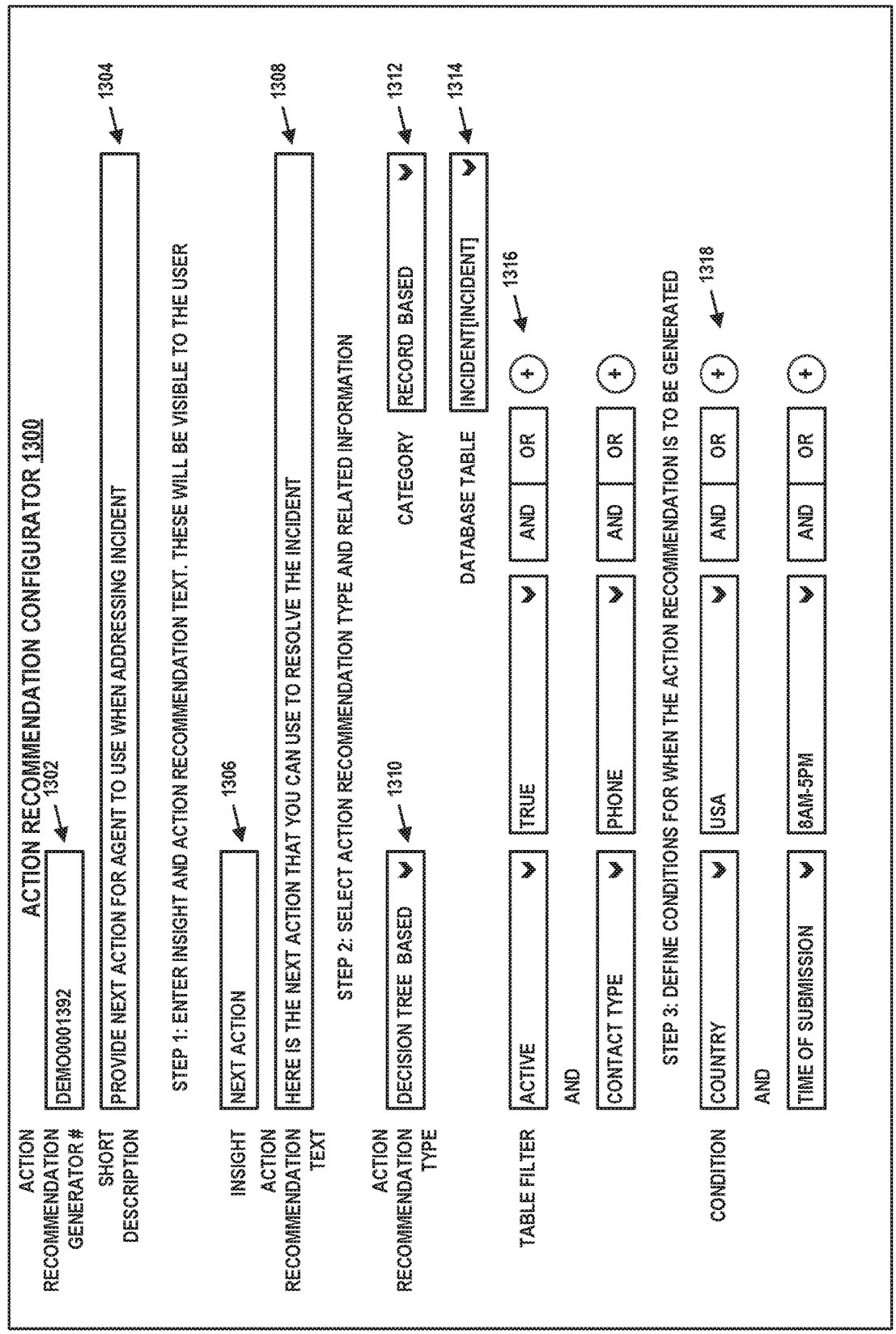
FIG. 13 depicts a graphical user interface for configuration of a decision-tree-based action recommendation generator, in accordance with example embodiments.

As fourth example, FIG. 13 depicts action recommendation configurator 1300 for a decision-tree-based model that makes action recommendations relating to actions an agent can take when addressing an incident. Action recommendation configurator 1300 also includes a number of graphical elements, such as text boxes, selectors, drop down menus, expression specifiers, and so on.

Element 1302 is a text box that provides a unique number or identifier of the action recommendation generator. This number may be provided automatically by the action recommendation configurator so that it is unique across all action recommendation generators. Thus, the number might not be editable by the user.

Element 1304 is a text box containing a short description of the action recommendation generator. The user may enter a free form text description in this text box.

Element 1306 is a text box containing an "insight"—a title for the action recommendation when it appears to a user. For this example, the insight is a next recommended action that an agent should take.

Element 1308 is a text box containing the action recommendation text or text related thereto. For this example, the action recommendation text informs the user that the action recommendation is related to next recommended actions when addressing incidents.

Element 1310 is a drop-down menu specifying the action recommendation type. This menu may indicate, for example, that the action recommendation type is rule-based, ML-based, process-mining-based, or decision-tree-based. Here, element 1310 indicates that the action recommendation type is decision-tree-based.

Elements 1312 and 1314 are displayed because "decision tree based" is selected for element 1310. Element 1312 is a drop-down menu specifying the basis for the rules, for example, KPIs or records. Notably, "record based" is selected. Element 1314 is a drop-down menu specifying a database table in which to find the records. The incident table is selected.

Elements 1316 can be used to define a filter that potentially reduces the extent of entries in the database table of element 1314 for which the action recommendation is generated. For example, elements 1316 can be used to define a filter expression so that action recommendations are only generated for incidents that are active and contact type is phone (e.g., the incident was generated when a technology user placed a phone call to request assistance from IT support).

Elements 1318 can be used to define a condition for when action recommendations are to be generated. For example, elements 1318 indicate that the condition is satisfied when the country of origin is the United States and the time of submission is between 8 AM and 5 PM.

Features of the decision tree, while not explicitly defined in action recommendation configurator 1300, may be derived from values of fields in the selected database table. Thus, in the example of FIG. 13, each field in the incident table selected by way of element 1314 may be used as a feature to build a decision tree. The output of the decision tree is an indication of the issue predicted most likely to have caused incident, based on resolution text of historical incidents. For instance, given a particular set of values for the fields of a new incident related to emails not being synchronized, the decision tree might indicate that the agent should first ask the user what type of operating system there are using, then whether they are connected to the Internet, then whether they can access email at all, and so on.

Note that, for sake of convenience, FIGS. 10-13 do not depict the action recommendation generators therein being associated with a particular target user or being assigned to a particular output modality. However, these features could be added to the graphical user interfaces depicted in FIGS. 10-13, or may be accomplished by way of other graphical user interfaces.

VIII. EXAMPLE OPERATIONS

Figure 14:
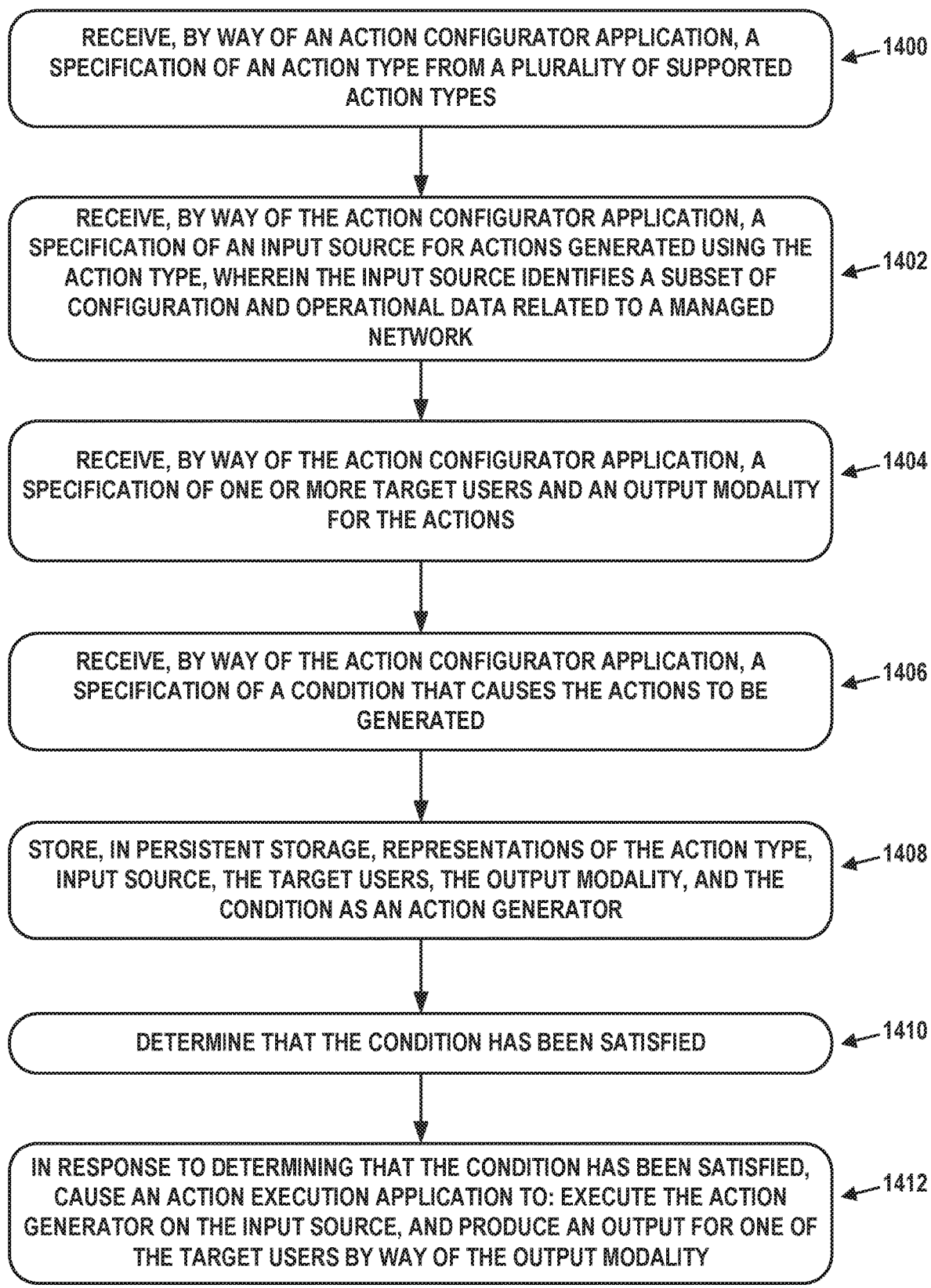
FIG. 14 is a flow chart, in accordance with example embodiments.

FIG. 14 is a flow chart illustrating an example embodiment. The process illustrated by FIG. 14 may be carried out by a computing device, such as computing device 100, and/or a cluster of computing devices, such as server cluster 200. However, the process can be carried out by other types of devices or device subsystems. For example, the process could be carried out by a computational instance of a remote network management platform.

The embodiments of FIG. 14 may be simplified by the removal of any one or more of the features shown therein. Further, these embodiments may be combined with features, aspects, and/or implementations of any of the previous figures or otherwise described herein.

Throughout the discussion herein, the term "action recommendation" may be shortened to "action" where appropriate. Thus, for example, an action recommendation engine may be referred to as an "action engine", an action recommendation generator may be referred to as an "action generator", an action recommendation type may be referred to as an "action type", and so on.

Block 1400 may involve receiving, by way of an action configurator application, a specification of an action type from a plurality of supported action types.

Block 1402 may involve receiving, by way of the action configurator application, a specification of an input source for actions generated using the action type, wherein the input source identifies a subset of configuration and operational data related to a managed network.

Block 1404 may involve receiving, by way of the action configurator application, a specification of one or more target users and an output modality for the actions.

Block 1406 may involve receiving, by way of the action configurator application, a specification of a condition that causes the actions to be generated.

Block 1408 may involve storing, in persistent storage, representations of the action type, input source, the target users, the output modality, and the condition as an action generator.

Block 1410 may involve determining that the condition has been satisfied.

Block 1412 may involve, possibly in response to determining that the condition has been satisfied, causing an action execution application to: execute the action generator on the input source, and produce an output for one of the target users by way of the output modality.

In some embodiments, the input source identifies a database table or a log file stored within the persistent storage.

In some embodiments, the output modality is a section of a particular graphical user interface that the system provides to the target users.

In some embodiments, the one or more target users have a specified persona or role with respect to the managed network.

In some embodiments, the condition is triggered based on a periodic schedule.

In some embodiments, the condition is triggered based on the one of the target users requesting a web page.

In some embodiments, the action configurator application is disposed within a computational instance of a remote network management platform, and the action execution application is disposed within a central instance of the remote network management platform.

In some embodiments, the action type is a rule-based model. These embodiments may also involve receiving, by way of the action configurator application, a specification of one or more rules for the rule-based model, wherein the one or more rules are based on Boolean, arithmetic, or propositional logic.

In some embodiments, the action type is a machine-learning-based model. These embodiments may also involve receiving, by way of the action configurator application, a specification of a technique of the machine-learning-based model, wherein the technique is based on one or more of classification, similarity or clustering.

In some embodiments, the action type is a process-mining-based model, and the condition is determined by values from the input source or a key performance indicator related to the input source.

In some embodiments, the action type is a decision-tree-based model. These embodiments may also involve receiving, by way of the action configurator application, a specification of a plurality of variables with which to generate a decision tree, wherein the variables are from the input source.

Some embodiments may further involve receiving, by way of the action configurator application, a specification of a filter to apply to the input source, wherein the filter is a Boolean expression, and wherein the action generator is executed on the input source as filtered.

IX. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing configuration and operational data related to a managed network, an action configurator application, and an action execution application; and
   one or more processors configured to:
      receive, by way of the action configurator application, a specification of an action type from a plurality of supported action types;
      receive, by way of the action configurator application, a specification of an input source for actions generated using the action type, wherein the input source identifies a subset of the configuration and operational data;

receive, by way of the action configurator application, a specification of one or more target users and an output modality for the actions, wherein the one or more target users are identified based on a group specified as part of the managed network;

receive, by way of the action configurator application, a specification of a condition that causes the actions to be generated;

store, in the persistent storage, representations of the action type, input source, the target users, the output modality, and the condition as an action generator;

determine that the condition has been satisfied; and in response to determining that the condition has been satisfied, cause the action execution application to: execute the action generator on the input source, and produce an output for one of the target users by way of the output modality, and wherein the output modality is a section of a particular graphical user interface that the system provides to the target users.

2. The system of claim 1, wherein the input source identifies a database table or a log file stored within the persistent storage.

3. The system of claim 1, wherein the output modality is a section of a particular graphical user interface that the system provides to the target users.

4. The system claim 1, wherein the one or more target users have a specified persona or role with respect to the managed network.

5. The system of claim 1, wherein the condition is triggered based on a periodic schedule.

6. The system of claim 1, wherein the condition is triggered based on the one of the target users requesting a web page.

7. The system of claim 1, wherein the action configurator application is disposed within a computational instance of a remote network management platform, and wherein the action execution application is disposed within a central instance of the remote network management platform.

8. The system of claim 1, wherein the action type is a rule-based model, and wherein the one or more processors are further configured to:

receive, by way of the action configurator application, a specification of one or more rules for the rule-based model, wherein the one or more rules are based on Boolean, arithmetic, or propositional logic.

9. The system of claim 1, wherein the action type is a machine-learning-based model, and wherein the one or more processors are further configured to:

receive, by way of the action configurator application, a specification of a technique of the machine-learning-based model, wherein the technique is based on one or more of classification, similarity or clustering.

10. The system of claim 1, wherein the action type is a process-mining-based model, and wherein the condition is determined by values from the input source or a key performance indicator related to the input source.

11. The system of claim 1, wherein the action type is a decision-tree-based model, and wherein the one or more processors are further configured to:

receive, by way of the action configurator application, a specification of a plurality of variables with which to generate a decision tree, wherein the variables are from the input source.

12. The system of claim 1, wherein the one or more processors are further configured to:

receive, by way of the action configurator application, a specification of a filter to apply to the input source, wherein the filter is a Boolean expression, and wherein the action generator is executed on the input source as filtered.

13. A computer-implemented method comprising:

receiving, by way of an action configurator application, a specification of an action type from a plurality of supported action types;

receiving, by way of the action configurator application, a specification of an input source for actions generated using the action type, wherein the input source identifies a subset of configuration and operational data related to a managed network;

receiving, by way of the action configurator application, a specification of one or more target users and an output modality for the actions, wherein the one or more target users are identified based on a group specified as part of the managed network;

receiving, by way of the action configurator application, a specification of a condition that causes the actions to be generated;

storing, in persistent storage, representations of the action type, input source, the target users, the output modality, and the condition as an action generator;

determining that the condition has been satisfied; and in response to determining that the condition has been satisfied, causing an action execution application to: execute the action generator on the input source, and produce an output for one of the target users by way of the output modality, and wherein the output modality is a section of a particular graphical user interface that a system provides to the target users.

14. The computer-implemented method of claim 13, wherein the condition is triggered based on a periodic schedule.

15. The computer-implemented method of claim 13, wherein the condition is triggered based on the one of the target users requesting a web page.

16. The computer-implemented method of claim 13, wherein the action type is a rule-based model, the computer-implemented method further comprising:

receiving, by way of the action configurator application, a specification of one or more rules for the rule-based model, wherein the one or more rules are based on Boolean, arithmetic, or propositional logic.

17. The computer-implemented method of claim 13, wherein the action type is a machine-learning-based model, the computer-implemented method further comprising:

receiving, by way of the action configurator application, a specification of a technique of the machine-learning-based model, wherein the technique is based on one or more of classification, similarity or clustering.

18. The computer-implemented method of claim 13, wherein the action type is a process-mining-based model, and wherein the condition is determined by values from the input source or a key performance indicator related to the input source.

19. The computer-implemented method of claim 13, wherein the action type is a decision-tree-based model, the computer-implemented method further comprising:

receiving, by way of the action configurator application, a specification of a plurality of variables with which to generate a decision tree, wherein the variables are from the input source.

20. An article of manufacture including a non-transitory computer-readable medium, having stored thereon program instructions that, upon execution by a computing system, cause the computing system to perform operations comprising:
- receiving, by way of an action configurator application, a specification of an action type from a plurality of supported action types;
- receiving, by way of the action configurator application, a specification of an input source for actions generated using the action type, wherein the input source identifies a subset of configuration and operational data related to a managed network;
- receiving, by way of the action configurator application, a specification of one or more target users and an output modality for the actions, wherein the one or more target users are identified based on a group specified as part of the managed network;
- receiving, by way of the action configurator application, a specification of a condition that causes the actions to be generated;
- storing, in persistent storage, representations of the action type, input source, the target users, the output modality, and the condition as an action generator;
- determining that the condition has been satisfied; and
- in response to determining that the condition has been satisfied, causing an action execution application to: execute the action generator on the input source, and produce an output for one of the target users by way of the output modality, and wherein the output modality is a section of a particular graphical user interface that the computing system provides to the target users.

* * * * *